United States Patent [19]

Wherry

[11] 4,245,523

[45] Jan. 20, 1981

[54] ROCKER ARM

[75] Inventor: Joseph L. Wherry, Perrysburg, Ohio

[73] Assignee: Toledo Stamping & Manufacturing Company, Toledo, Ohio

[21] Appl. No.: 825,676

[22] Filed: Aug. 18, 1977

Related U.S. Application Data

[63] Continuation-in-part of Ser. No. 775,955, Mar. 9, 1977, Pat. No. 4,132,196, which is a continuation-in-part of Ser. No. 618,951, Oct. 2, 1975, abandoned.

[51] Int. Cl.³ ............................ G05G 1/00; F16F 1/00
[52] U.S. Cl. ................................ 74/579 E; 123/90.36
[58] Field of Search ................. 123/90.36; 74/96, 579, 74/55

[56] References Cited

U.S. PATENT DOCUMENTS

| | | | |
|---|---|---|---|
| 2,563,699 | 8/1951 | Winter, Jr. | 123/90.36 X |
| 2,905,161 | 9/1959 | Latham | 123/90.36 |
| 3,146,767 | 9/1964 | Dadd | 123/90.36 |
| 3,179,094 | 4/1965 | Ribeton | 123/90.36 |
| 3,410,366 | 11/1968 | Winter, Jr. | 123/90.36 X |
| 3,855,981 | 12/1974 | Loon | 123/90.36 X |
| 3,897,761 | 8/1975 | Fleischer et al. | 123/90.36 X |

FOREIGN PATENT DOCUMENTS 2147040  4/1973  Fed. Rep. of Germany ........ 123/90.36

Primary Examiner—Samuel Scott
Assistant Examiner—Wesley S. Ratliff, Jr.
Attorney, Agent, or Firm—Allen D. Gutchess, Jr.

[57] ABSTRACT

A rocker arm and a method of making the same are provided. In one form, the rocker arm is of the wrap-around type in which a metal sheet is appropriately symmetrically shaped and is then bent back on itself on the line of symmetry at which one end of the rocker arm body is formed. The two halves are then affixed together by projection welding or the like. The rocker arm has two diverging, downwardly-extending walls formed at the one end of the body with a separate socket member then resistance welded to the walls. The socket member has a central oil opening which supplies oil to a push rod from an oil passage in the rocker arm body. This passage, in turn, communicates with an oil supply passage in a shaft on which the rocker arm is rotatably supported through a hole in a bearing sleeve carried by the rocker arm body. A second, separate passage communicates with the other end of the rocker arm and with the oil supply passage in the shaft through a separate hole in the bearing sleeve. In another form, the rocker arm is made from two separate halves which are again affixed together by projection welding or the like. In this instance, the socket is integrally formed in the two halves by coining. In a third form, the rocker arm is made by the wrap-around technique with the socket being integrally formed in the two halves by coining. This combination enables the socket to be continuous and seamless around the outer end portion.

3 Claims, 9 Drawing Figures

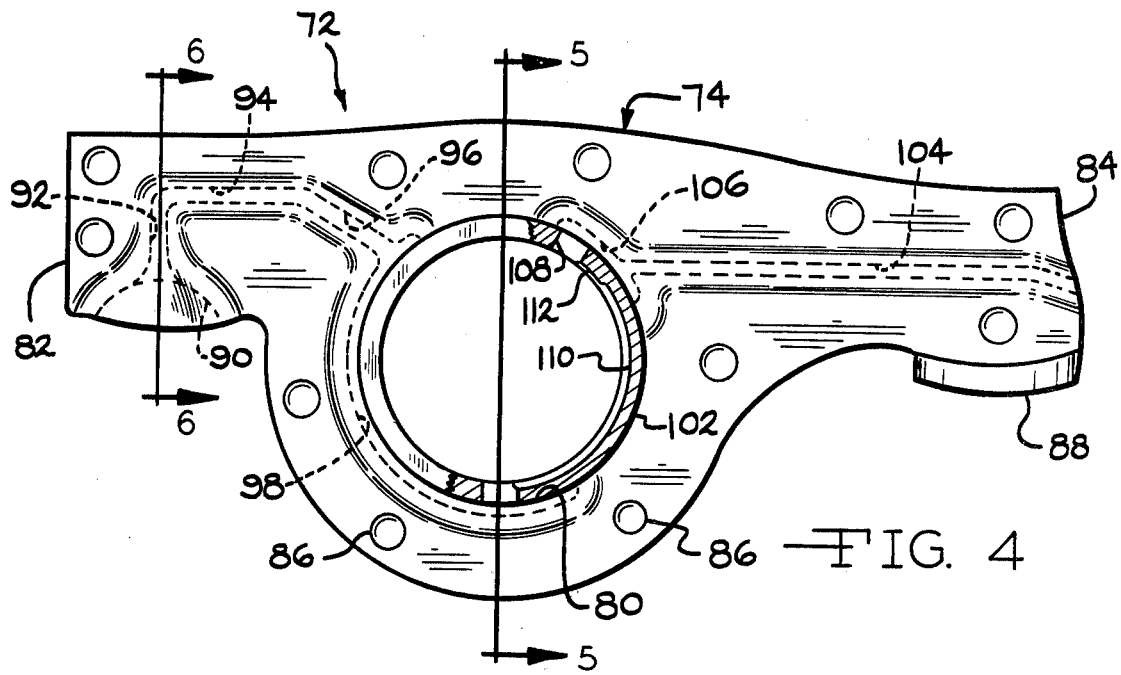
FIG. 4
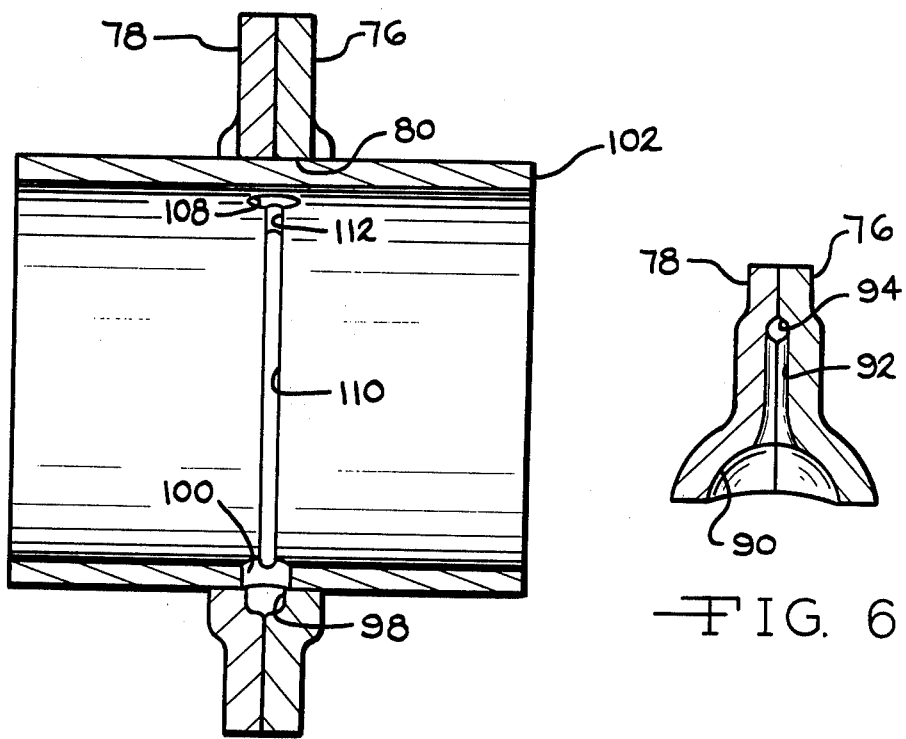
FIG. 5
FIG. 6

ROCKER ARM

This application is a continuation-in-part of my copending application Ser. No. 775,955, filed Mar. 9, 1977, now U.S. Pat. No. 4,132,196 which is a continuation-in-part of my application Ser. No. 618,951, filed Oct. 2, 1975, now abandoned.

This invention relates to a rocker arm and to a method of making the same.

A rocker arm according to the invention can be of the wrap-around type in which a metal sheet is appropriately symmetrically shaped to form two contoured halves or parts of the rocker arm body. The metal sheet is then bent back on itself at the line of symmetry, with the two halves of the sheet affixed together by projection welding. Appropriate portions of the resulting rocker arm body are suitably further shaped, as by coining or swaging. A bearing sleeve is also suitably centrally affixed in an opening in the rocker arm body with this bearing sleeve being rotatably mounted on a shaft of an internal combustion engine with which the rocker arm is employed. Heretofore, a separate member for contacting a push rod was threaded into a tapped hole at the end of the rocker arm body where the line of symmetry exists. This member was a machined part and further required drilling to receive oil.

A rocker arm in accordance with the present invention can have a stamped socket member which is resistance welded to diverging, downwardly-extending walls at the one end of the rocker arm body. The cost of the stamped socket member is considerably less than the threaded machined member heretofore employed and the threaded hole in the rocker arm is also eliminated. The rocker arm has an effective oil supply passage arrangement for supplying oil through the socket member to the push rod with a positive flow. The rocker arm also has a second, separate passage for supplying oil to the opposite end of the arm.

In the manufacture of the new rocker arm, the body is shaped and stamped in a manner similar to that heretofore known, but with the diverging, downwardly-extending walls also formed thereon. The socket member is then resistance welded to the walls. Subsequently, the socket member is sized by being struck again.

In a modification, the rocker arm is made of two separate sheet metal halves which are resistance-welded and brazed. The socket member, in this instance, is formed structurally integral in the two metal halves which further reduces the cost of the rocker arm. In this modification, the rocker arm also has separate oil supply passages for supplying oil to the two ends of the rocker arm through separate openings in a central bearing sleeve or bushing communicating with a rocker arm shaft through which the oil is supplied. This again provides a positive flow of oil under positive pressure to the socket.

In another modification, the rocker arm can be of the wrap-around type with a metal sheet substantially symmetrically shaped and then bent back on itself at the line of symmetry, with the two halves affixed together by projection welding. The socket member is then formed structurally integral in the two metal halves by a coining operation or the like. The socket member resulting with this modification is continuous and seamless around the outer end portion thereof. This avoids the possibility of failure by the splitting of the socket member due to the action thereon by the push rod of the engine.

It is, therefore a principal object of the invention to provide an improved, lower cost rocker arm.

Another object of the invention is to provide a rocker arm of wrap-around construction with a socket member formed at the joined end.

A further object of the invention is to provide a rocker arm with a positive flow of oil through a socket member at one end thereof and through a separate passage to the other end.

Other objects and advantages of the invention will be apparent from the following detailed description of a preferred embodiment thereof, reference being made to the accompanying drawings, in which:

FIG. 4 is a side view in elevation of a modified rocker arm according to the invention;

FIG. 5 is a view in transverse cross section taken along the line 5—5 of FIG. 4;

FIG. 6 is a view in transverse cross section taken along the line 6—6 of FIG. 4;

Figure 1:
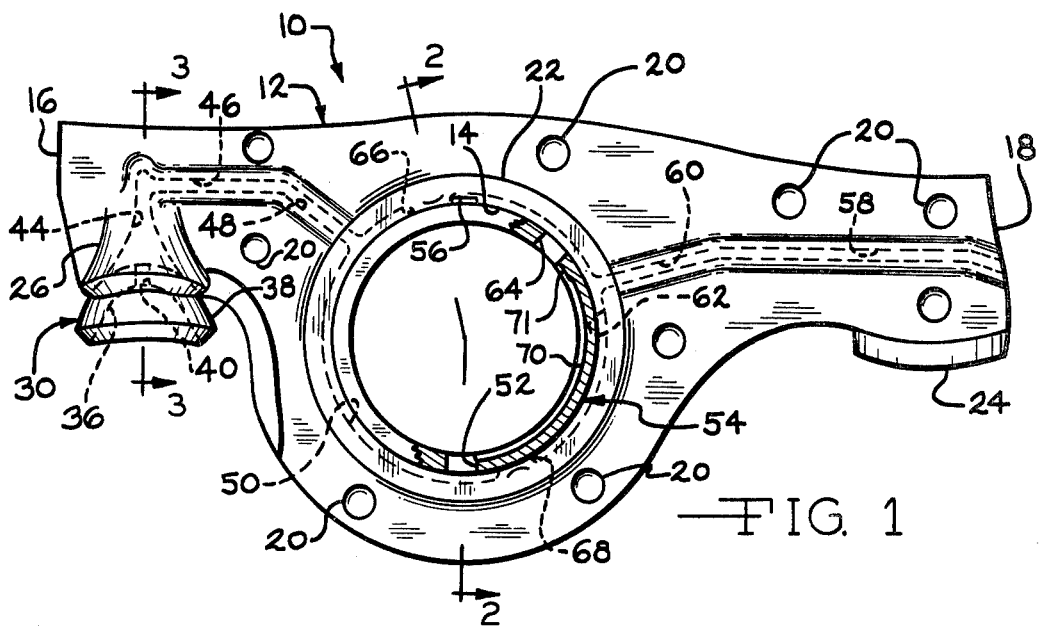
FIG. 1 is a side view in elevation of a rocker arm according to the invention.

Referring to the drawing, and particularly to FIG. 1, a rocker arm in accordance with the invention is indicated at 10 and includes a main body 12. The body 12 has a central opening 14 with ends 16 and 18 on opposite sides thereof. The rocker arm 10, in this instance, is of the wrap-around type and is made of a metal sheet shaped with two contours similar to that shown in FIG. 1, with the two contoured halves being substantially symmetrical with respect to a line located at the end 16 of the body 12. When the metal sheet is bent back on itself, the two halves are affixed together by projection welds indicated at 20. Each of the two halves of the body 12 has a transversely-extending circular flange 22 which forms the opening 14 and also has a cam flange or pad 24 swaged or coined thereon to form a wear surface to contact a valve stem.

The end 16 of the rocker arm body 12 is formed with two diverging, downwardly-extending walls 26 and 28 formed from the two halves of the metal sheet. Each of these walls is generally of a semi-conical shape and the two form a generally conical inner cavity.

A separate cup or socket member 30 is affixed to the lower edges of the two walls 26 and 28 by resistance welding, with the two walls and socket member being affixed by fused metal portions 32 and 34. The socket member 30 is stamped from a metal sheet and has a downwardly-facing concave surface 36 which is shaped to receive the upper end of a push rod of an engine. The socket member 30 also has an upwardly-facing convex surface 38 which is affixed to the diverging walls. Further, the socket member 30 has a centrally-located oil opening 40 pierced therein. This communicates with a cavity 42 formed between the walls 26 and 28 at the end 16, with the cavity 42, in turn, communicating with an upwardly-extending oil passage 44. The passage 44 is formed by matching grooves in the continuous surfaces of the two sheet metal halves constituting the body. The passage 44 communicates with a horizontally-extending passage 46 and a slanted passage 48. The passage 48 connects with an arcuate central oil groove 50 formed between the two sheet metal halves where the flanges 22 are formed outwardly. The groove 50 receives oil from a lower opening 52 in a bearing sleeve or bushing 54 which is assembled with the flanges 22 in a known manner and staked at 56 on opposite sides thereof. The opening 52 is below the center of the sleeve 54 and preferably in the bottom. The sleeve 54 is rotatably mounted on a central hollow shaft or rod of the engine through which oil is supplied, with the shaft having a lower supply opening for each rocker arm through which the oil flows outwardly and through the opening 52 in the bearing sleeve 54. This oil then progresses through the arcuate groove 50 along with the rocker arm body passages 48, 46, and 44, the rocker arm cavity 42, and through the central opening 40 in the socket member 30. A positive flow of oil is thereby established downwardly through the push rod and to the hydraulic valve lifter therebelow. This flow of oil is opposite to that normally achieved through an assembly of components of this type.

Flow of oil is also provided for the wear surface of the flange 24. This is achieved through a generally horizontal passage 58 which opens at the end 18 and from which oil can flow downwardly to the valve contact. The passage 58 communicates with a slanted passage 60 and with an arcuate groove 62 formed by the two sheet metal halves of the rocker arm body. The groove 62 receives oil through a small opening 64 located above the center of the bearing sleeve 54 which receives oil from the rocker arm shaft. The arcuate grooves 50 and 62 are separated by dams 66 and 68 which are formed by dimples in the metal sheet during the stamping operation. With this separate arrangement of the oil flow passages, it is assured that a larger and positive flow will be achieved for the socket member 30. The bearing sleeve 54 also has an inwardly-facing arcuate groove 70 and a shallow groove 71 connected between the openings 52 and 64. These grooves are of controlled size to provide a controlled flow of oil to the opening 64 during the arcuate or oscillatory motion of the rocker arm 10 on the shaft. The oil is not under any substantial pressure as it flows through the opening 64 and to the rocker arm end 18.

In the manufacture of the rocker arm 10, the separate stamped socket member 30 is resistance welded to the bottom edges of the walls 26 and 28 after the body of the rocker arm is formed. After welding, the lower concave surface 36 of the member is struck again to overcome any distortions resulting from the welding. This then assures a close fit between the concave surface 36 of the socket member 30 and the upper convex end of the push rod. Consequently, a positive flow of oil is assured from the rocker arm and the socket member downwardly through the push rod because of the close cooperative fit therebetween.

Referring particularly to FIGS. 4–6 a modified rocker arm in accordance with the invention is indicated at 72 and includes a main body 74 of two separate halves 76 and 78 made of metal sheets. The body has a central opening 80 with ends 82 and 84 on opposite sides thereof. The two sheets 76 and 78 are substantially symmetrical and are affixed together by projection welds 86. In this instance, the rocker arm does not have flanges corresponding to the circular flanges 22 but simply the central opening 80. This opening must be held closely in size which is the reason that the rocker arm 72 is made in the two separate halves 76 and 78. These halves are more easily aligned than the wrap-around type of rocker arm of FIGS. 1–3. Transversely-extending flanges are formed on the sheets 76 and 78 at the end 84 to provide a cam flange or pad 88 to contact the valve stem, similar to the flange 24 of FIG. 1.

The end 82 of the rocker arm body has a socket or cup 90 formed in the lower edges of the sheets or halves 76 and 78 to receive the upper end of a push rod of an engine. The socket 90, in this instance, is structurally integral with the halves 76 and 78, being formed by coining. It has been found that the socket, through proper coining operations, can be shaped precisely enough to form a close fit with the upper end of the push rod without employing a separate cup.

The socket 90 communicates with a centrally located oil passage 92 formed by arcuate grooves, which are coined in the two metal halves 76 and 78. The passage 92 connects with a horizontally-extending passage 94 and a slanted passage 96. The latter passage connects with an arcuate central oil passage 98 which is formed like the passages 92–96 by grooves coined in the metal sheets 76 and 78, as shown in FIG. 5. The arcuate passage 98, in turn, communicates with a lower opening 100 in a bearing sleeve or bushing 102. This opening is below the center of the sleeve 102 and preferably in the bottom thereof. In this instance, the bearing sleeve 102 has a light press fit in the opening 80 of the body 74 and is affixed therein by braze metal.

Figure 2:
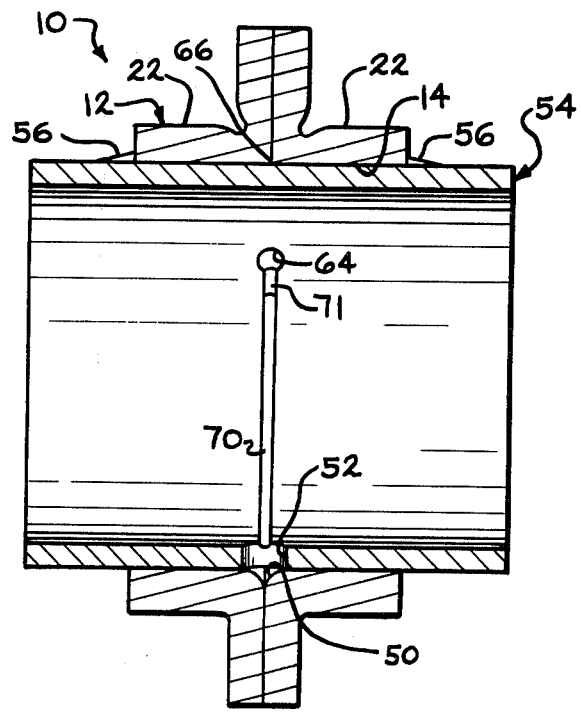
FIG. 2 is a view in transverse cross section taken along the line 2—2 of FIG. 1.
Figure 3:
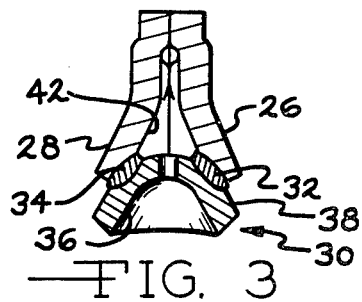
FIG. 3 is a view in transverse cross section taken along the line 3—3 of FIG. 1.

As in the embodiment of FIGS. 1–3, the bearing sleeve 102 is rotatably mounted on a central rocker arm shaft through which oil is supplied, with the shaft having a lower opening aligned with each rocker arm, through which opening the oil flows outwardly and substantially directly through the lower opening 100 under pressure. The oil then flows under positive pressure through the arcuate groove 98 and the passages 96, 94, and 92 to the socket 90. A positive flow of oil is thereby established downwardly through the push rod in contact with the socket 90 and to a hydraulic valve lifter therebelow.

A separate flow of oil is provided for the flange or pad 88. This is accomplished through a generally horizontal passage 104 which opens at the end 84 and from which oil can flow downwardly to the flange. The passage 104 communicates with an arcuate passage 106, with the passages being formed in the same manner as the other passages. The passage 106 receives oil through an upper opening 108 located above the center of the bearing sleeve 102. The opening 108, in turn, receives oil from the rocker arm shaft with the sleeve 102 having an inwardly-facing arcuate groove 110 and a shallower groove 112 which enable oil from the supply opening to be carried at a controlled rate up to the opening 108 during the arcuate or oscillatory motion of the rocker arm 72 on the shaft. As before, this oil is under substantially no positive pressure as it flows to the end 84.

In the manufacture of the rocker arm 72, the separate metal halves 76 and 78 are aligned through the central openings forming the opening 80 after being coined and shaped to form the various passages, partial socket, and projection welds. The two halves are projection welded together, restruck, and then edge coined to partially form the flange 88 and the socket 90. The initial coining of the edges reduces the crack at the meeting edges of the two halves at the flange and socket. The amount of braze metal is thereby reduced, excess braze metal being undesirable since it will not harden. The hole 80 is sized and the bushing assembled therein with a light press fit. The assembly is brazed and then edge coined again to produce the finished dimensions for the flange and socket. The bushing or bearing sleeve is also sized and the rocker arm is then heat treated to complete the product.

Figure 7:
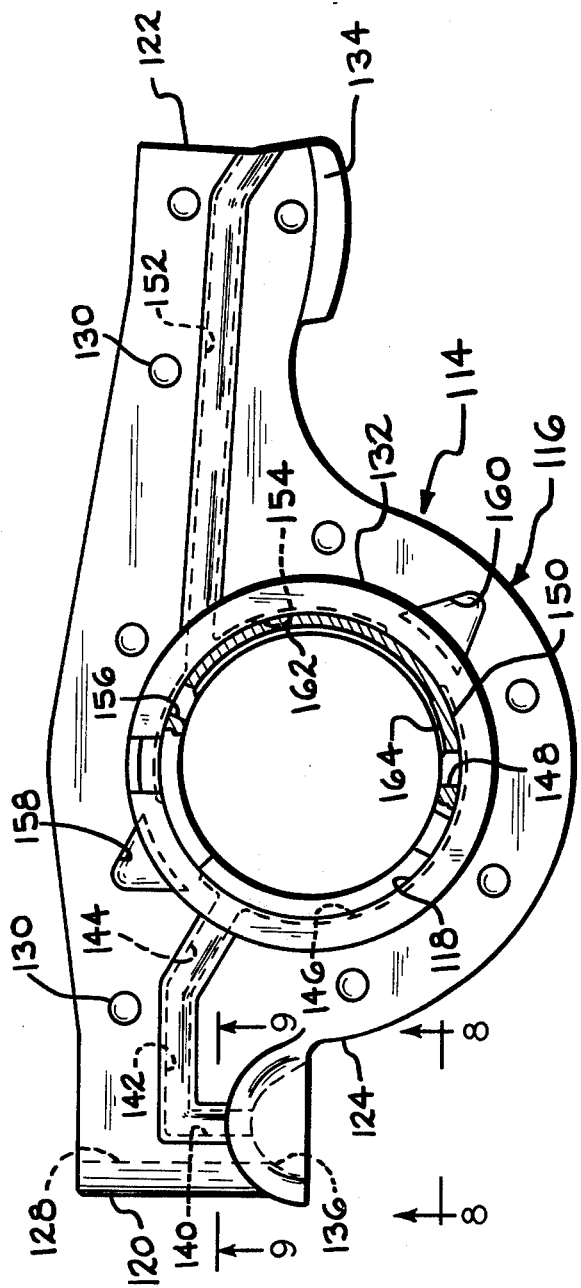
FIG. 7 is a side view in elevation of another modified rocker arm according to the invention.
Figure 9:
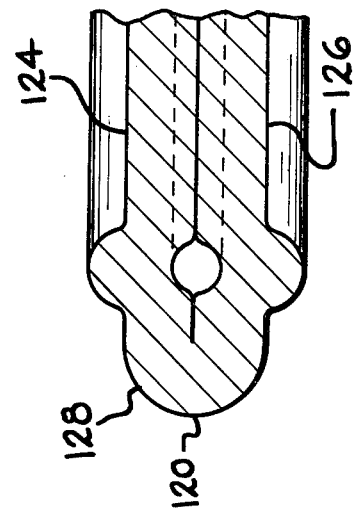
FIG. 9 is a fragmentary view in transverse cross section taken along the line 9—9 of FIG. 7.
Figure 8:
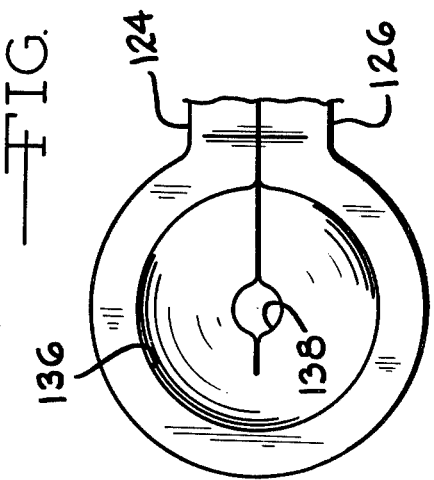
FIG. 8 is a fragmentary bottom view taken along the line 8—8 of FIG. 7.

Referring particularly to FIGS. 7–9, a further modified rocker arm in accordance with the invention is indicated at 114 and includes a main body 116. The body 116 has a central opening 118 with outer ends 120 and 122 on opposite sides thereof. The rocker arm 114 is of the wrap-around type and is made of a metal sheet shaped with two contours similar to the body 116 of FIG. 7. Two contoured halves 124 and 126 are connected by a web 128 at the end 120 of the body 116. When the metal sheet is bent back on itself at the web 128, the two halves 124 and 126 are affixed together by projection welds indicated at 130. Each of the halves 124 and 126 has a transversely-extending circular flange 132 which form the opening 118. Each of the halves also has a cam flange or pad 134 swaged or coined thereon to form a lower surface to contact a valve stem at the end 122.

The end 120 of the rocker arm body 116 has a socket or cup 136 formed in the lower edges of the body halves 124 and 126 to receive the upper end of a push rod of an engine. The socket 136 is structurally integral with the halves 124 and 126, being formed by edge coining or the like. It has been found that the socket can be shaped precisely enough to form a close fit with the upper end of the push rod without having to employ the separate cup. The socket 136 has the advantage of the lower cost of the rocker arm of FIG. 4 and yet the socket is stronger, more similar to the strength of the separate socket 30 of FIG. 1. This is because the rocker arm construction enables the socket to be continuous at the outer end where the web 128 exists. Without a seam at that portion of the socket, there is little chance that the socket can tend to split through the force applied to it from the reciprocation of the push rod. Thus, the rocker arm 114 achieves advantages of both of the rocker arms 10 and 72 and the brazing can also be eliminated.

As before, the socket 136 has a centrally-located opening 138 therein which communicates with a central oil passage 140 which, in turn, connects with a generally horizontally-extending passage 142 and a slanted passage 144. These passages are formed by arcuate grooves which are coined in the two metal halves 124 and 126. The slanted passage 144 connects with an arcuate central passage 146 formed between the two halves where the flanges 132 extend outwardly. The passage 146 receives oil from a lower opening 148 in a bearing sleeve or bushing 150 which is assembled with the flanges 132 in the same manner as the sleeve 54 of FIG. 1. The sleeve 150 is rotatably mounted on a central hollow shaft of the engine through which oil is supplied, with the shaft having a lower supply opening for each rocker arm through which the oil flows outwardly and through the opening 148 from which the oil progresses to the socket 136. Again, a positive flow of oil is achieved through the push rod and through the hydraulic valve lifter below it. This flow of oil is opposite to that normally achieved through an assembly of components of this type.

Flow of oil is also provided from the opening 148 to the flanges 134 forming the pad. A generally horizontal passage 152 opens at the rocker arm end 122 and enables oil to flow down to the pad. The passage 152, in turn, communicates with an upper opening 156 which receives oil through an arcuate passage 154 communicating with the upper opening 156. The arcuate passages 146 and 154 are separated by dams formed by dimples 158 and 160 in the halves 124 and 126. The opening 156 receives oil from the supply opening in the lower portion of the rocker arm shaft through an inwardly-facing, arcuate groove 162 in the inner surface of the sleeve 150 and a shallower groove 164. These enable oil from the supply opening to be carried at a controlled rate up to the opening 156 during the arcuate or oscillatory motion of the rocker arm 114 on the hollow shaft. With the shallow groove 164 located at the supply end of the arcuate groove 162, less oil pressure is built up in the groove 162 so that more of the oil reaches the opening 156 and less is forced out the sides of the groove 162, between the inner surface of the sleeve 150 and the outer surface of the rocker arm shaft.

From the above, it will be seen that the new rocker arm has a number of advantages. The socket is of lower cost than the machined, threaded members heretofore employed and the cross drilling of the machined members also is eliminated. The necessity of threading or tapping the end of the rocker arm body to receive the machined member also is no longer necessary. The positive flow of oil from the shaft through the rocker arm body and the socket member to the push rod also is unique to the new rocker arm design, along with the separate flow of oil to the other end of the rocker arm.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A rocker arm comprising a main body having two substantially symmetrical body halves joined by a narrow web symmetrically located between the body halves, said body having a central opening with a bearing surface to be rotatably supported on a rocker arm shaft having an oil supply opening through which oil is supplied under positive pressure, said body terminating in ends on opposite sides of said openings, one of which ends has the web, said one end being formed to provide a structurally-integral socket to receive an end of a push rod, said socket being continuous and seamless at the outer end where the web exists, and having a seam at the inner end formed by the two body halves, the other end of said body being formed with outwardly-extending lower flanges to provide a surface to engage a valve stem, said bearing surface having two peripherally-spaced oil openings therein, said rocker arm body having first enclosed passage means connecting said socket with one of said oil openings, said first passage means comprising a central passage communicating with a central portion of said socket and formed by said body halves and said web, said first passage means further comprising an additional passage communicating with said central passage and with said one oil opening, said body having second passage means which is separate from said first passage means connecting the other of said oil openings with the other end of said body, and said bearing surface having an inwardly-facing arcuate groove extending substantially between said oil openings.

2. A rocker arm according to claim 1 characterized by said arcuate groove having a smaller groove forming a restriction adjacent said one oil opening whereby oil supplied to said socket is under a positive pressure.

3. A rocker arm according to claim 1 characterized by said bearing surface being formed by a bearing sleeve and said oil openings extending through said sleeve and communicating with the shaft on which the body is rotatably supported.

* * * * *